United States Patent [19]

Aho

[11] Patent Number: 4,470,579

[45] Date of Patent: Sep. 11, 1984

[54] POST FOR AN ELECTRIC FENCE AND METHOD FOR THE MANUFACTURE THEREOF

[75] Inventor: Yrjö Aho, Espoo, Finland

[73] Assignee: Exel oy, Helsinki, Finland

[21] Appl. No.: 299,321

[22] Filed: Sep. 3, 1981

[30] Foreign Application Priority Data

Mar. 4, 1981 [FI] Finland ................................. 810674

[51] Int. Cl.³ ................................................ A01K 3/00

[52] U.S. Cl. ........................................ 256/10; 256/19; 174/161 F

[58] Field of Search ................ 256/10, 19; 174/158 F, 174/161 F, 163 F, 45 R

[56] References Cited

U.S. PATENT DOCUMENTS

| | | | |
|---|---|---|---|
| 2,821,365 | 1/1958 | Lach | 256/19 |
| 3,531,090 | 9/1970 | Laible | 256/10 |
| 3,669,413 | 6/1972 | Laible | 256/10 |
| 3,891,189 | 6/1975 | Russo | 256/19 |
| 3,977,653 | 8/1976 | Fingerson et al. | 256/10 |
| 4,070,007 | 1/1978 | Minor et al. | 256/19 |

FOREIGN PATENT DOCUMENTS

| | | |
|---|---|---|
| 852801 | 11/1960 | United Kingdom . |
| 1307786 | 2/1973 | United Kingdom . |

*Primary Examiner*—Andrew V. Kundrat
*Attorney, Agent, or Firm*—Mason, Fenwick & Lawrence

[57] ABSTRACT

A post for an electric fence, comprising a straight stick portion (1), a base member (2) secured to the stick portion, and two plastic insulating members (3 and 4) disposed at a distance from each other. Stick portion (1) is made of reinforced plastic and base member (2) and insulating members (3 and 4) are manufactured straight upon the stick portion by injection moulding. All injection components (2, 3 and 4) are manufactured in one working step by one injection mould. After the manufacturing step, one (4) of the insulating members is displaced along the stick portion to its desired position. Base member (2) and the other insulating member (3) are fixedly mounted on said stick portion (1) by means of recesses or roughenings made therein.

10 Claims, 5 Drawing Figures

POST FOR AN ELECTRIC FENCE AND METHOD FOR THE MANUFACTURE THEREOF

The present invention relates to a post for an electric fence, comprising a straight stick portion, a base member secured to the stick portion, and at least one plastic insulating member designed for the attachment and support of an electric fence wire.

The stick portion for this type of prior art electric fence posts is generally made of a metal pipe, such post, however, being relatively expensive and heavy. Upon bending it, the post made of a metal pipe remains in bent position which calls for fence repairs. In addition, there is, between the fence wire and conductive metal post, a relatively narrow insulating gap which may become conductive by the action of e.g. moisture and dirt, the effectiveness of the fence being weakened and battery consumption increased. Another drawback of metal posts is rusting.

The object of the invention is to provide an improved post for an electric fence which, amongst others, overcomes all the abovementioned drawbacks.

For this object, an electric fence post of the invention is characterized in that the stick portion is made of reinforced plastic and that the base member and insulating member are manufactured by injection moulding straight upon said stick portion.

A stick portion of reinforced plastic is of light weight and has a good modulus of elasticity. Such a post straightens out completely even after very forceful bending. Why this is important is that cattle to be tended often lean against the fence thus bending the posts. This has earlier required quite a lot of fence repairs which are not eliminated by using the posts of the invention.

The introduction of a stick portion made of reinforced plastic has been made possible especially by the solution of the invention that the base member and insulating member are manufactured straight upon said stick portion by injection moulding. Thus, it has been possible in a simple and cost-saving manner to resolve the problems which would otherwise occur in efforts to secure base and insulating members to a stick portion made of reinforced plastic.

Generally, the electric fences for tending cattle are provided with two wires, one above the other. Thus, each post must have two insulating members at a distance from each other. According to a preferred embodiment of the invention, the insulating member at the top end of a post and the base member at the opposite end are fixedly mounted on the stick portion by means of recesses made therein, and another insulating member is injection moulded on a smooth-surfaced stick portion, whereby the latter member can be displaced along said stick portion.

The cross-sectional shape of a stick portion is most preferably flat, having a pair of opposed broad, flat sides and a pair of opposed narrow, angled sides, the wire attachment means of said insulating members being mounted on a flat side of a stick portion. Thus, the stick is more readily capable of bending in the direction perpendicular to the fence, this being the direction the loads to the fence and posts are applied in. To avoid turning of the ground-stuck anchoring means of a post and to keep it firmly in vertical position in this situation, the top end of said base member is provided with an extension in a plane parallel to the flat sides of the stick portion, the upper edge of said extension being reinforced so as to serve as a stamping surface on one narrow side of the stick portion. Thus, the posts can be stuck into the ground by simply stamping them in.

The method of the invention for the manufacture of an electric fence post is characterized in that the stick portion is made of reinforced plastic and the base member and insulating member are prepared straight upon the stick portion by injection moulding.

In order to effect the manufacture with as few injection moulds and working steps as possible, the base member and insulating member are moulded—each for different posts—simultaneously in one and the same injection mould. According to a preferred embodiment of the invention, two insulating members are made around a stick portion in the same injection mould so as to lie at a small distance from each other and, following the manufacturing step, one of the insulating members is displaced along the stick portion to a desired position.

One embodiment of the invention will now be described in more detail with reference made to the accompanying drawings, in which.

Figure 1:
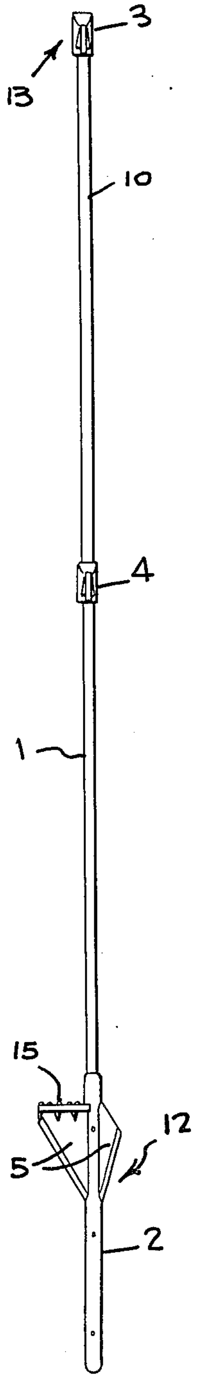
FIG. 1 shows an electric fence post according to the invention in side view and FIG. 2 shows the same as turned through 90°.
Figure 2:
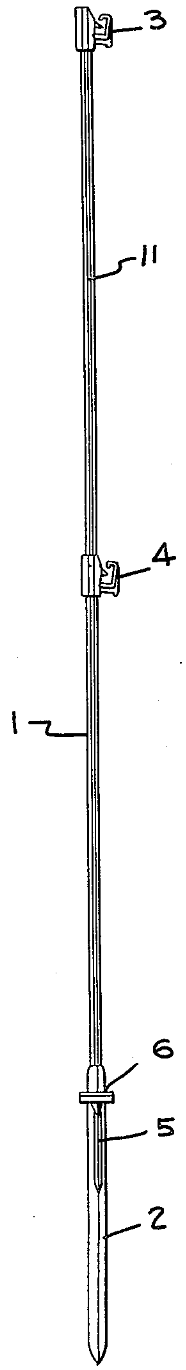
Figure 3:
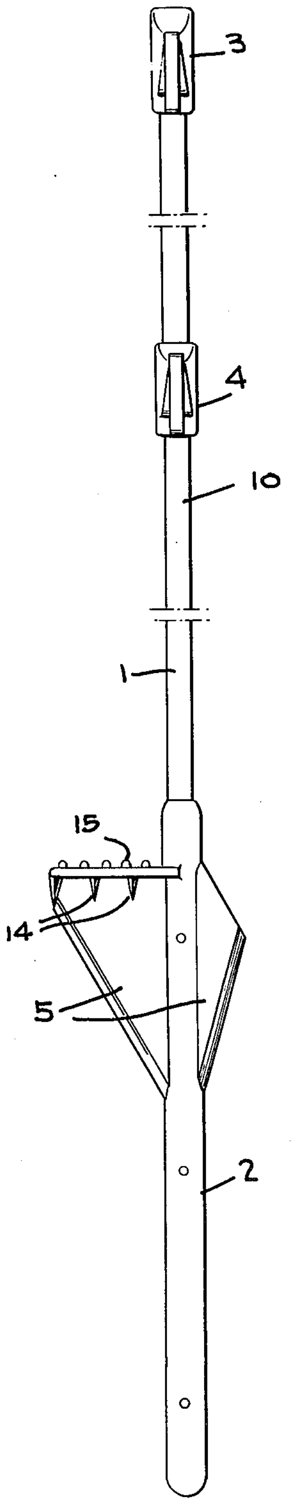
FIGS. 3 and 4 show the same post as FIGS. 1 and 2 but to a larger scale and the stick portion partly in cross-section.
Figure 4:
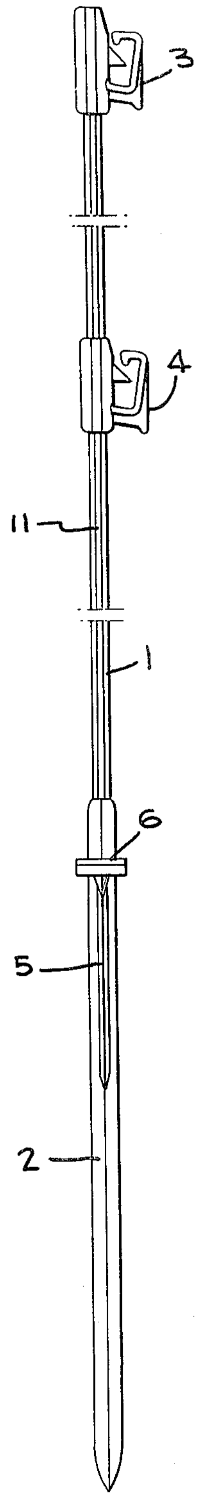

The straight stick portion 1 of a post is made e.g. of reinforced polyester plastic by conventional technology by pulling resin-wetted polyester fibres through a die. The resulting stick portion is entirely composed of polyester fibers bound together by resin. Thus, the stick portion is drawn into a desired profiled shape which, in the present embodiment, is preferably flat, having a pair of opposed broad, flat sides 10 and a pair of opposed narrow, angled sides 11, so that the width of said stick portion across the angled sides 11 is approximately 6 mm and across the flat sides 10 is approximately 10 mm. It has been verified that such a stick portion is sufficiently rigid to maintain the fence in an upright position, while being sufficiently resilient to absorb loads. For example, when a load is applied to the fence, the flat sides of the stick portion bend resiliently. The bending of the stick portion prevents the ground-stuck portion from becoming displaced, which would cause the fence to tilt.

The base of stick portion 1 has injection moulded thereon a base member 2, comprising an extension 5 in a plane parallel to the flat sides 10 of stick portion 1, said extension resisting the turning of the ground-stuck base member 2 in the ground under the action of loads perpendicular to the fence. The top edge of extension 5 adjacent one of the narrow sides of the stick portion is reinforced by widening to serve as a stamping surface 6 by means of which the post can be stuck into the ground by stamping the widened top edge can also be reinforced by the use of a plurality of struts 14 integral therewith and extending thereunder. Projections 15 on the top edge provide traction for the foot of the person installing the post.

The top end and intermediate section of the post are provided with plastic insulating members 3 and 4 designed for the attachment of and support for the wire of an electric fence. In this design, attention has also been paid to the aspect that the wire can be wound around such insulating member to eliminate eventual loose parts.

Figure 5:
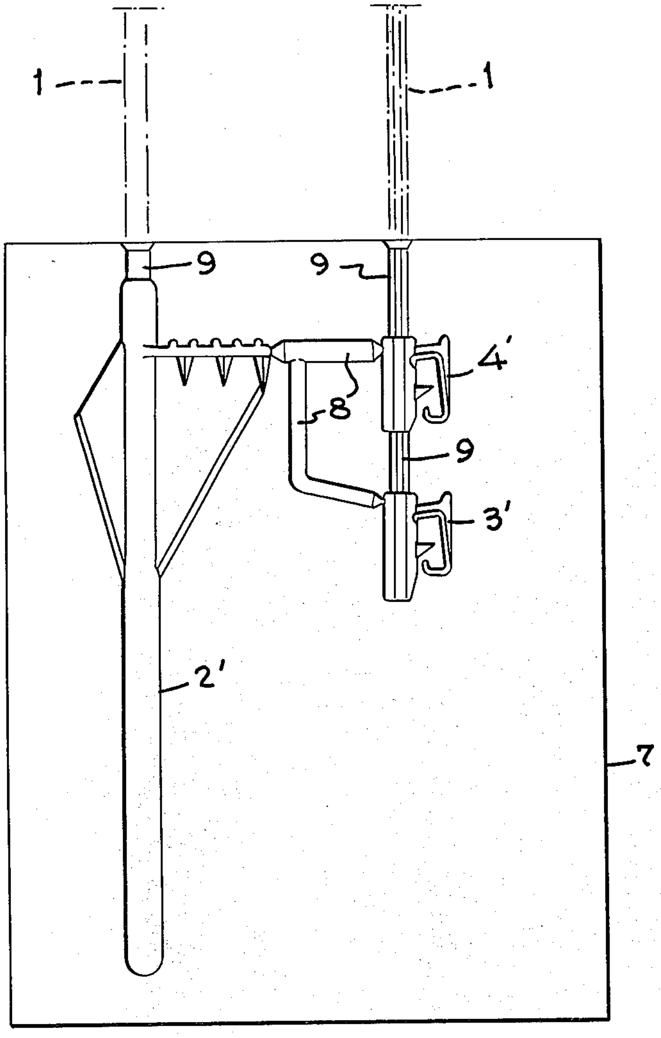
FIG. 5 shows one half of an injection mould to be used in the method according to the invention.

FIG. 5 shows one half 7 of an injection mould to be used for the manufacture of components, 2, 3 and 4. It comprises a space 2' matching the base member 2 and spaces 3', 4' matching the insulating members 3 and 4, all these spaces being located close to each other in one body. Spaces 2', 3' and 4' are connected to each other by a supply conduit 8 through which plastics for injection moulding, e.g. polyethene, is passed simultaneously into all spaces 2', 3' and 4'. Stick portion 1 fills mould cavities 9 to form a block for mould cavities 2', 3' and 4'. As shown in FIG. 5, two stick portions 1 are simultaneously inserted in the mould, the base end of one in the mould cavity 2' and the top end of the other in the mould cavities 3' and 4'. Stick portions 1 are provided with recesses or roughenings at the bottom end 12 and the top end 13, where components 2 and 3 respectively are to be injection moulded in mould cavities 2' and 3' whereby said components adhere firmly upon the stick 1. The insulating member 4 is moulded on a smooth stick portion and, thus, this insulating member 4 can be later displaced along the stick portion 1 to a desired level. However, such displacement requires so much force that the insulating member 4 is not moved by loads normally occurring during the use. This way the manufacture is made economically advantageous and all components to be injection moulded can be produced at one time by means of a small-sized mould.

The stick portion 1 can be protection varnished prior to moulding of the injection components. The recesses or roughenings required for the attachment of fixed injection components 2 and 3 can be made e.g. during the cutting step of stick portions 1.

I claim:

1. A post for supporting wire for an electric fence, comprising:
- a straight stick portion made of reinforced plastic and having a pair of opposed broad, flat sides and a pair of opposed narrow sides such that said stick portion is substantially flat in cross-section;
- a base member fitted upon said stick portion by injection moulding;
- first and second plastic insulating members for supporting the wire and attaching it to the fence, said insulating members being fitted upon said stick portion by injection moulding;
- said first insulating member and said base member being fixedly mounted to said stick portion at opposite ends thereof, and said second insulating member being movable along said stick portion; and
- wherein said stick portion is provided with an upper recess at the top end thereof and a lower recess at the bottom end thereof, said first insulating member being mounted at said upper recess and said base member being mounted at said lower recess.

2. A post as claimed in claim 1, wherein each of said insulating members includes wire attachment means, said wire attachment means facing one of said broad sides of said stick portion.

3. A post as claimed in claim 1, wherein the top end of said base member has an extension parallel to said broad sides of said stick portion, and wherein the top edge of said extension is reinforced to serve as a stamping surface.

4. A post as claimed in claim 1, wherein said reinforced plastic comprises polyester fibres bonded by resin.

5. A post as claimed in claim 1, wherein said broad sides are approximately 10 mm. across, and said narrow sides are approximately 6 mm. across.

6. A post for supporting wire for an electric fence, comprising:
- a straight stick portion made of reinforced plastic and having a pair of opposed broad, flat sides and a pair of opposed narrow sides such that said stick portion is substantially flat in cross-section;
- a base member fitted upon said stick portion by injection moulding;
- first and second plastic insulating members for supporting the wire and attaching it to the fence, said insulating members being fitted upon said stick portion by injection moulding;
- said first insulating member and said base member being fixedly mounted to said stick portion at opposite ends thereof, and said second insulating member being movable along said stick portion; and
- wherein said stick portion is provided with upper and lower roughenings respectively at the top end thereof and at the bottom end thereof, said first insulating member being mounted at said upper roughening and said base member being mounted at said lower roughening.

7. A post as claimed in claim 6, wherein each of said insulating members includes wire attachment means, said wire attachment means facing one of said broad sides of said stick portion.

8. A post as claimed in claim 6, wherein the top end of said base member has an extension parallel to said broad sides of said stick portion, and wherein the top edge of said extension is reinforced to serve as a stamping surface.

9. A post as claimed in claim 6, wherein said reinforced plastic comprises polyester fibres bonded by resin.

10. A post as claimed in claim 6, wherein said broad sides are approximately 10 mm. across, and said narrow sides are approximately 6 mm. across.

* * * * *